(12) United States Patent
Marney

(10) Patent No.: US 9,420,909 B2
(45) Date of Patent: Aug. 23, 2016

(54) BEVERAGE HOLDER

(71) Applicants: Paul Marney, Freshwater (AU); John Szaka, Manly (AU); Daniel Paul, Kurrajong (AU)

(72) Inventor: Paul Marney, Freshwater (AU)

(*) Notice: Subject to any disclaimer, the term of this patent is extended or adjusted under 35 U.S.C. 154(b) by 0 days.

(21) Appl. No.: 14/744,419

(22) Filed: Jun. 19, 2015

(65) Prior Publication Data

US 2015/0366334 A1     Dec. 24, 2015

(30) Foreign Application Priority Data

Jun. 20, 2014    (AU) ................................. 2014902379

(51) Int. Cl.
     *A45F 5/10*          (2006.01)
     *A47G 23/02*        (2006.01)
     *B60N 3/10*         (2006.01)

(52) U.S. Cl.
     CPC .............. *A47G 23/0208* (2013.01); *B60N 3/10* (2013.01); *A45F 2200/0583* (2013.01)

(58) Field of Classification Search
     CPC .............. A45F 5/10; A45F 2200/0583; A47G 23/0208; B60N 3/10
     USPC ................. 294/141–143, 159–163, 167, 169, 294/87.28; 211/77
     See application file for complete search history.

(56) References Cited

U.S. PATENT DOCUMENTS

| | | | | |
|---|---|---|---|---|
| 1,264,151 A | * | 4/1918 | Brand | 294/32 |
| 1,448,259 A | * | 3/1923 | Cook | 294/143 |
| 2,153,391 A | * | 4/1939 | Projansky | 294/27.1 |
| 2,654,628 A | * | 10/1953 | Klante | 294/137 |
| 3,908,877 A | * | 9/1975 | Kosisky | 294/143 |
| 5,842,671 A | * | 12/1998 | Gibbs | 248/231.41 |
| 7,543,869 B2 | * | 6/2009 | Davis et al. | 294/146 |
| 8,231,161 B2 | * | 7/2012 | Longley et al. | 294/167 |
| 2009/0230065 A1 | * | 9/2009 | Wax | 211/60.1 |
| 2013/0119005 A1 | * | 5/2013 | Gray | 211/85.18 |
| 2014/0014552 A1 | * | 1/2014 | Pokora et al. | 206/558 |

* cited by examiner

*Primary Examiner* — Dean Kramer
(74) *Attorney, Agent, or Firm* — Kartsounes Law, LLC

(57) ABSTRACT

A holder for drinking vessels, the holder 1 comprising a handle 2; a plurality of arms 3 extending from handle 2, each arm 3 being movable in relation to one another, a holding element 8 attached to each arm 3, each holding element 8 being configured to hold a respective drinking vessel in an upright position; and an elongate member 6 attached to the handle 2. Each of the arms 3 includes an aperture 16 for receiving the elongate member 6 wherein each aperture 16 has a diameter decreasing toward the handle 2 so that each arm 3 is nestable within an adjacent arm 3.

8 Claims, 7 Drawing Sheets

BEVERAGE HOLDER

FIELD OF THE INVENTION

The present invention relates to a holder for holding a plurality of drinking vessels.

BACKGROUND OF THE INVENTION

When refreshments are served in public places such as bars, restaurants, and outdoor events, it is frequently the case that a purchaser will purchase beverages for more than one person at a time. Further, when a group of people are enjoying refreshments in a person's home or in the office, it is frequently the case that one person is responsible for collecting beverages for a multiple number of people. Unfortunately, the human hand is only designed to carry a small number of beverages at one time. It can therefore be awkward returning to one's seat or friends with multiple beverages. This is particularly the case when a person cannot support all of the beverages in one hand.

SUMMARY OF THE INVENTION

Disclosed herein is a holder for drinking vessels. The holder includes a handle and a plurality of arms extending from the handle. Each arm is moveable in relation to one another. A holding member is attached to each arm and is configured to hold a respective drinking vessel in an upright position. The holder includes attachment means to attach each of the arms to the handle.

In one form the holding member includes a C-shaped support configured to hold the drinking vessel.

Preferably, the holding member includes a buffer member disposed along an inside surface of the holding member and configured to cushion against the vessel.

Preferably, the arms are pivotably affixed to the handle, and still preferably the arms are pivotable in relation to one another.

In one form the arms are removably affixed to the top end of the handle at a pivot point.

In another form the arms are affixed to a point at the bottom end of the handle.

Preferably, the plurality of arms are adapted to move between a closed configuration in which each arm aligns with one another in an interleaved arrangement and an opened configuration in which each arm is radially spaced apart from another around a central axis. In one form in the holding configuration the arms are spaced about the pivot.

Preferably, each arm is lockable in a fixed configuration. In one form the plurality of arms can be locked into a fixed configuration with respect to one another.

Preferably, the handle is foldable into a closed position.

Advantageously this holder allows for a plurality of vessels containing beverages to be carried and easily balanced in one hand. In some forms, the holder allows for its own storage and collapsing by aligning within itself. Also in some forms the holder allows for the vessels containing beverages to be removed from the holder without the use of another hand.

BRIEF DESCRIPTION OF THE DRAWINGS

Preferred embodiments of the invention will now be described, by way of example only, with reference to the accompanying drawings in which.

DESCRIPTION OF THE PREFERRED EMBODIMENTS

Figure 1:
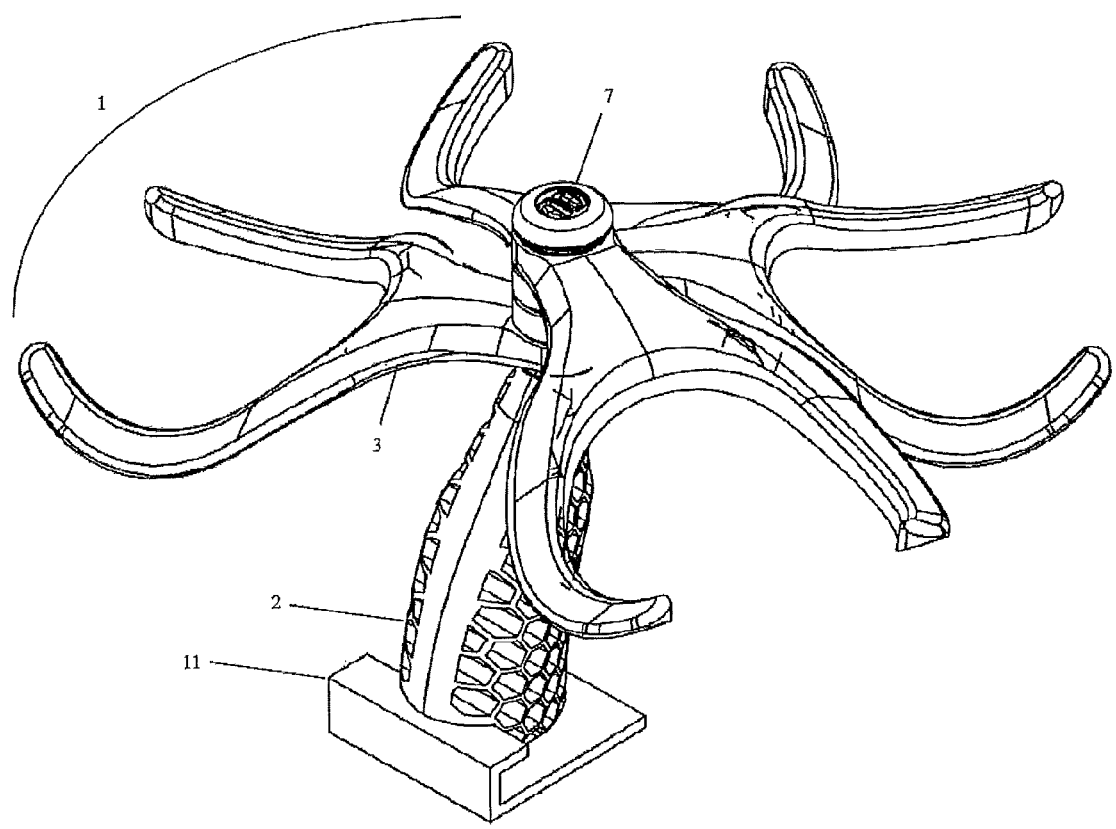
FIG. 1 is a perspective view of the holder of one embodiment of the present invention, the holder being in an open position.

Referring to FIGS. 1 to 9, disclosed is a holder 1 for holding a plurality of vessels containing beverages (not illustrated). The holder 1 comprises a handle 2 and a plurality of arms 3. The holder 1 may be manufactured from plastic such as glass filled polymer or glass filled nylon. Other suitable material may also be used, and any colour to suit specific brand or preference.

The holder 1 further includes a pivot 4 extending upwardly from the handle 2. The pivot 4 comprises an elongate member 5 and a locking lug 6. Each of the plurality of arms 3 is affixed with the elongate member 5 and held in place by an interlocking buffer 7. Each of the plurality of arms 3 is pivotal about the pivot point 4.

Figure 3:
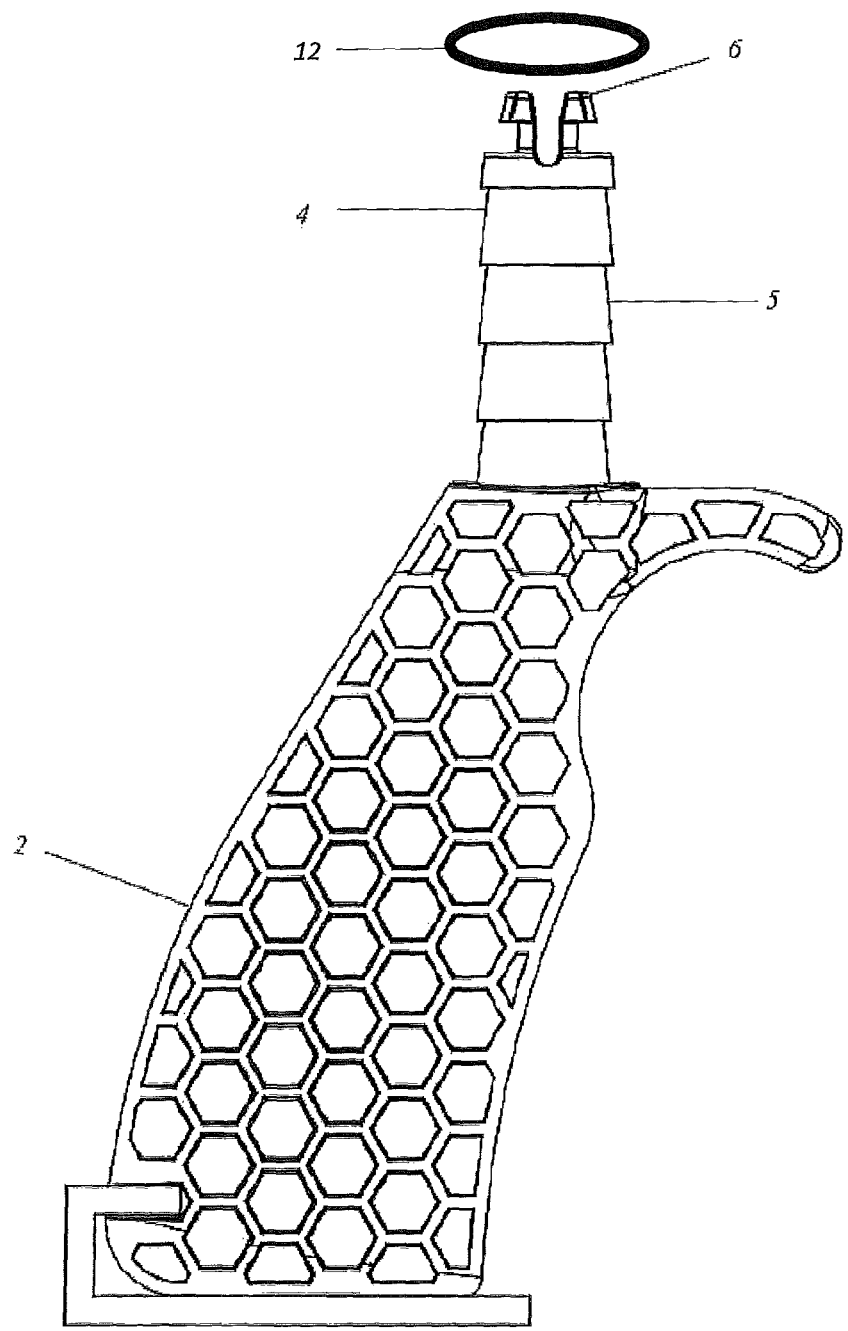
FIG. 3 is a side view of the handle of the holder in FIG. 1.
Figure 6:
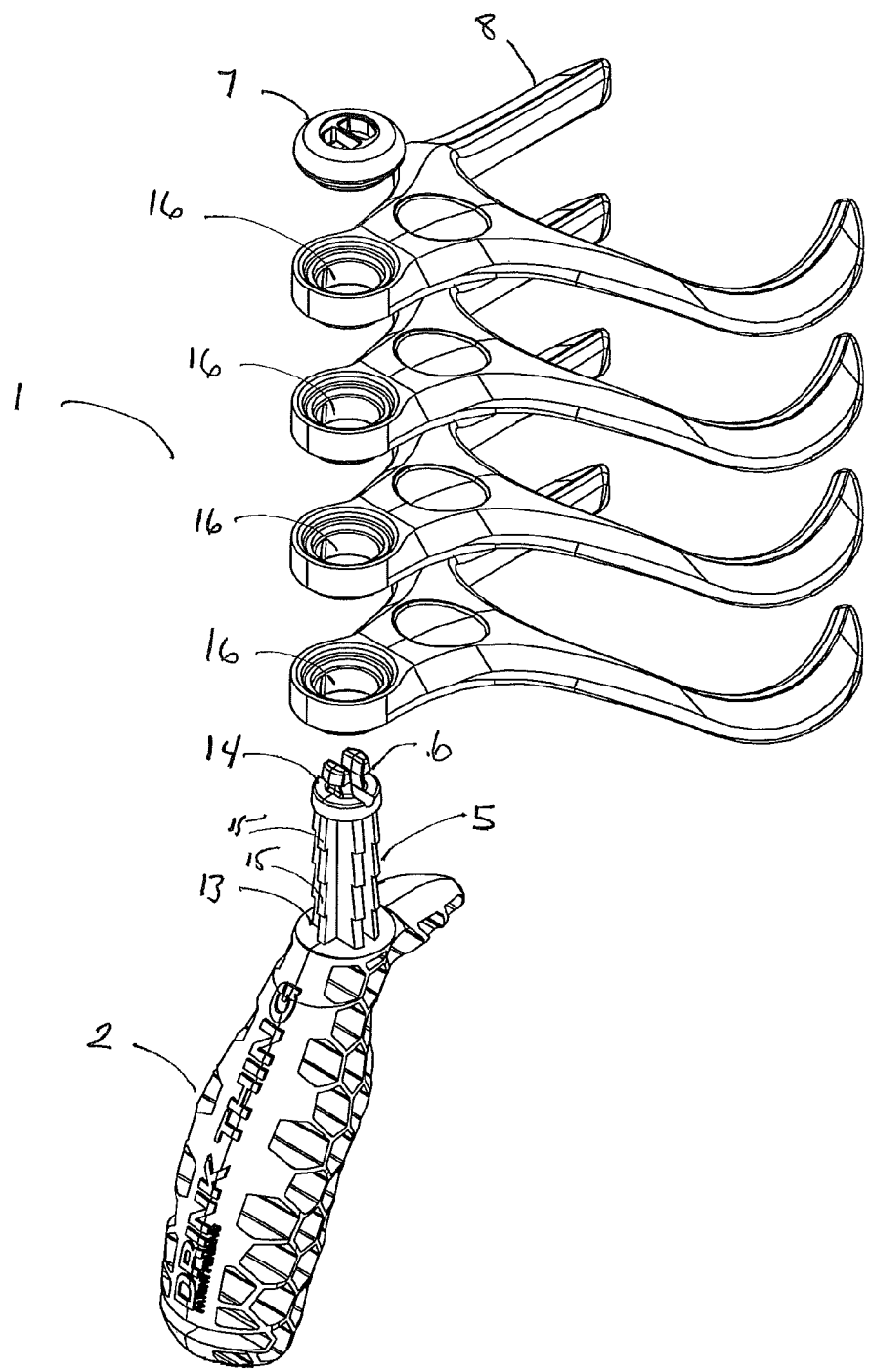
FIG. 6 is an exploded view of the holder of FIG. 1.

As best shown in FIG. 6 the holder 1 is easy to assemble with the arms 3 fitting over the elongate member 5 and locking into place. As shown in FIG. 3, a mechanical gasket such as an o-ring 12 is seated between the bottom arm 3 and the handle 2 to create a seal at the interface. The elongate member 5 is attached at one end 13 to the handle 2 and includes a locking lug 6 on the other end 14. The elongate member 5 includes barbs 15 directed toward the handle 2. The arms 3 each include an aperture 16. The aperture 16 has a diameter decreasing toward the handle 2 so each arm 3 is nestable within an adjacent arm 3. The barbs 15 securely position the arms 3 vertical, and the interlocking buffer 7 snaps, or locks onto the locking lug 6 to secure the arms 3 to the handle 2.

Each of the plurality of arms 3 is movable with respect to one another and with respect to the handle 2 about the pivot point 4. Each of arms 3 are movable between a closed position as shown in FIG. 2 in which the arms 3 are aligned with one another and an opened holding position as shown in FIG. 1 in which the arms 3 are spread about the pivot 4.

Each of the plurality of arms 3 includes a holding element 8 which extend from the arm 3. The holding element 8 is a C-shaped support which allows a glass or vessel with sides tapering inwards from their top to their bottom to be inserted into the holder 1 and for the wide section of the glass or vessel to be supported on the C-section of the holding element 8. It will be understood by persons skilled in the art that the holding element 8 could alternatively comprise a closed loop, claw, hook or any supporting mechanism.

Figure 2:
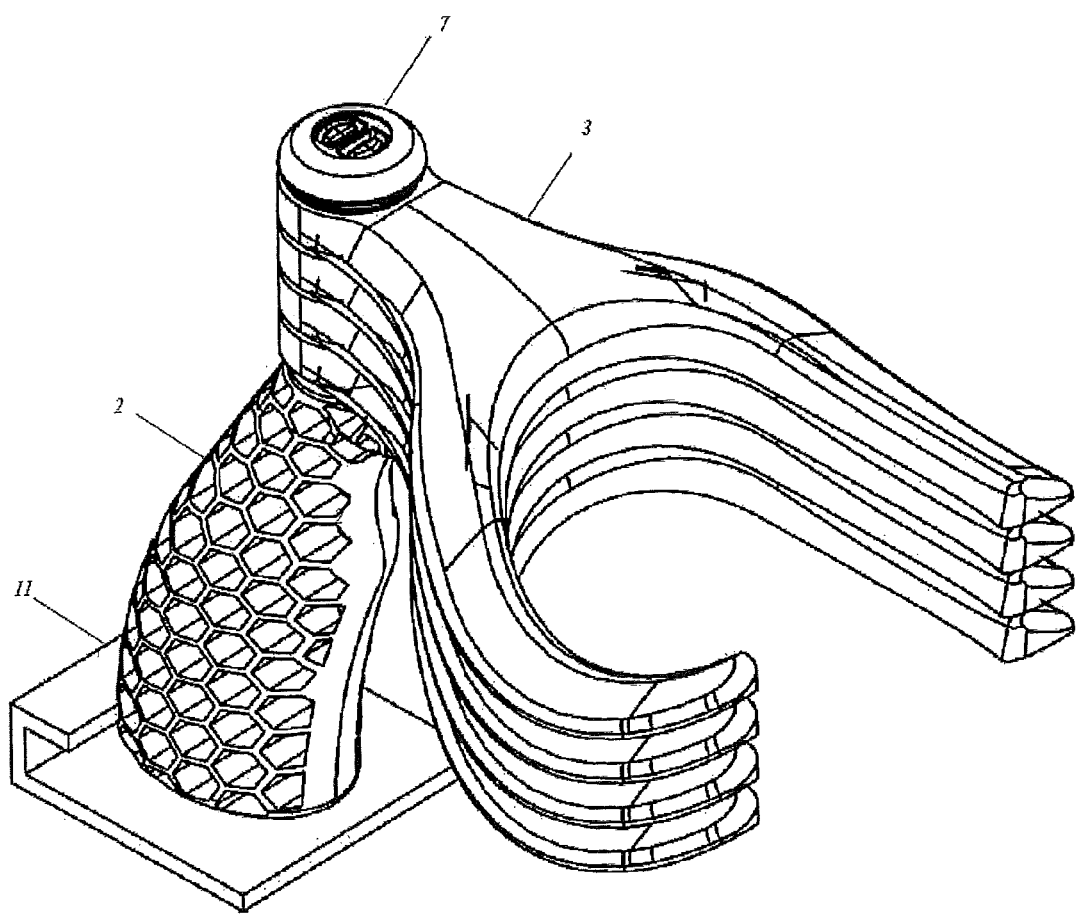
FIG. 2 is a top perspective view of the holder in a closed configuration.

When in use, the holder 1 is positioned such that the arms 3 are splayed into their holding configuration as shown in FIG. 1. A plurality of vessels containing beverages are inserted individually into each of the holding elements 8 and supported therein. A user then holds the handle 2 to carry the vessels containing beverages with one hand. Upon returning to the user's table or a bench, the user rests the handle 2 on the table or bench in an upright position. At the same time the user allows each of the vessels containing beverages in the holder 1 to rest on the table or bench. The holder 1 can then be removed laterally away from the vessels containing beverages leaving them resting upon the table or bench.

The arms 3 are locked into position in their opened holding configuration and/or their closed configuration by means of a catch (not illustrated) or other biasing means. This catch may comprise a spring loaded locking mechanism controlled by pressing a button on the handle 2 or the interlocking buffer 7. The locking mechanism may comprise a corrugated section adapted such that the arms 3 lock into position with an interference fit.

All parts of the holder 1 can be used for merchandising. Specifically, the handle 2, arms 3 and interlocking buffer 7 are easily adapted for merchandising printed or attached thereto. Replacement of the arms 3 or relabelling of the arms 3 allows for interchangeable merchandising or including more than one brand on a single holder.

The interlocking buffer 7 is removable from the locking lug 6 by pulling upwardly to release the press-fit arrangement. This allows for the arms 3 to be easily removed from the pivot 4 to allow for different configurations of the arms 3 and replacement of broken or worn parts. Further this allows for replacement of the buffer 7 to allow for interchangeable merchandising.

Figure 4:
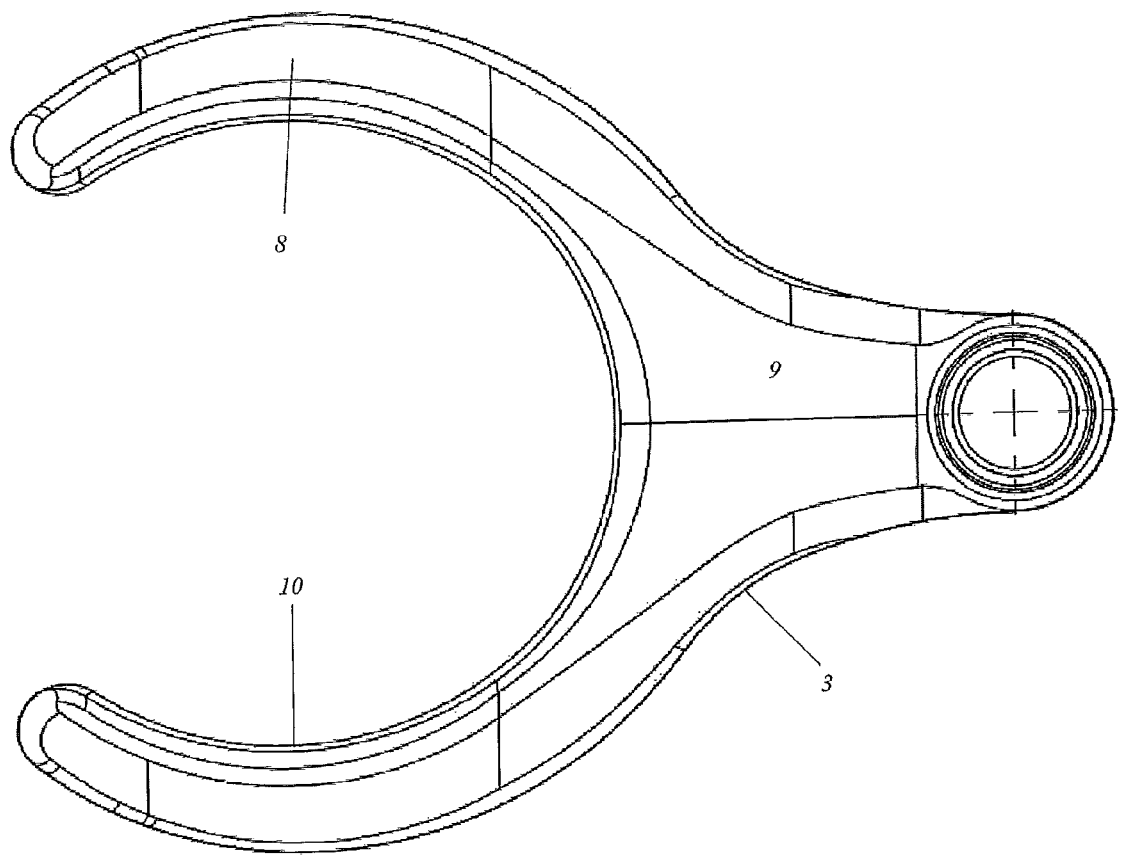
FIG. 4 is a top view of an arm element of the holder in FIG. 1.
Figure 5:
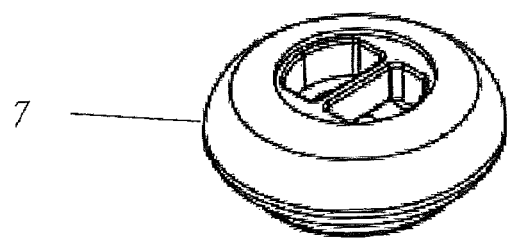
FIG. 5 is a top perspective view of a buffer element of the holder in FIG. 1.
Figure 7:
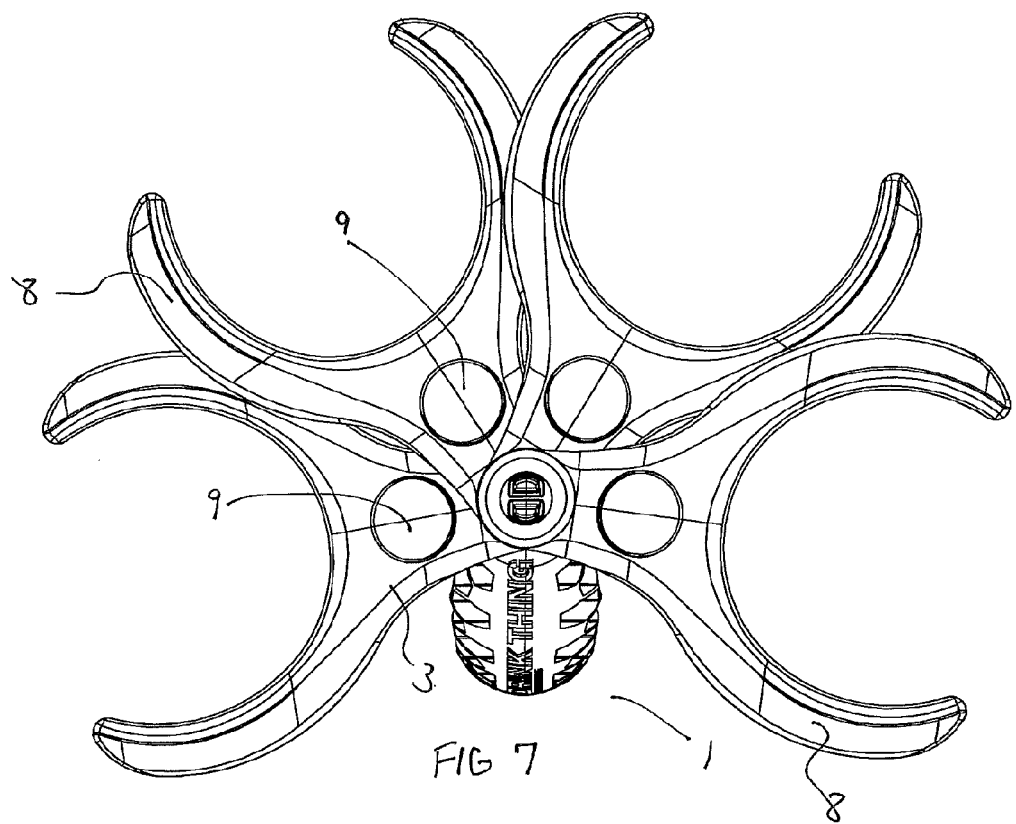
FIGS. 7 and 8 show top and side views of another embodiment of the holder of FIG. 1 in which the handle and arms include areas for markings.
Figure 8:
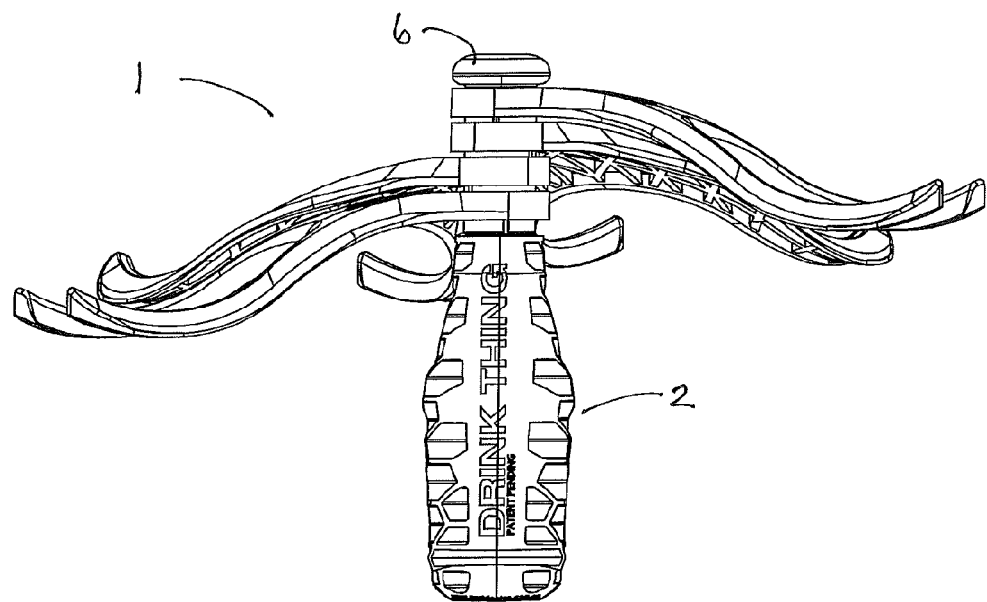
Figure 9:
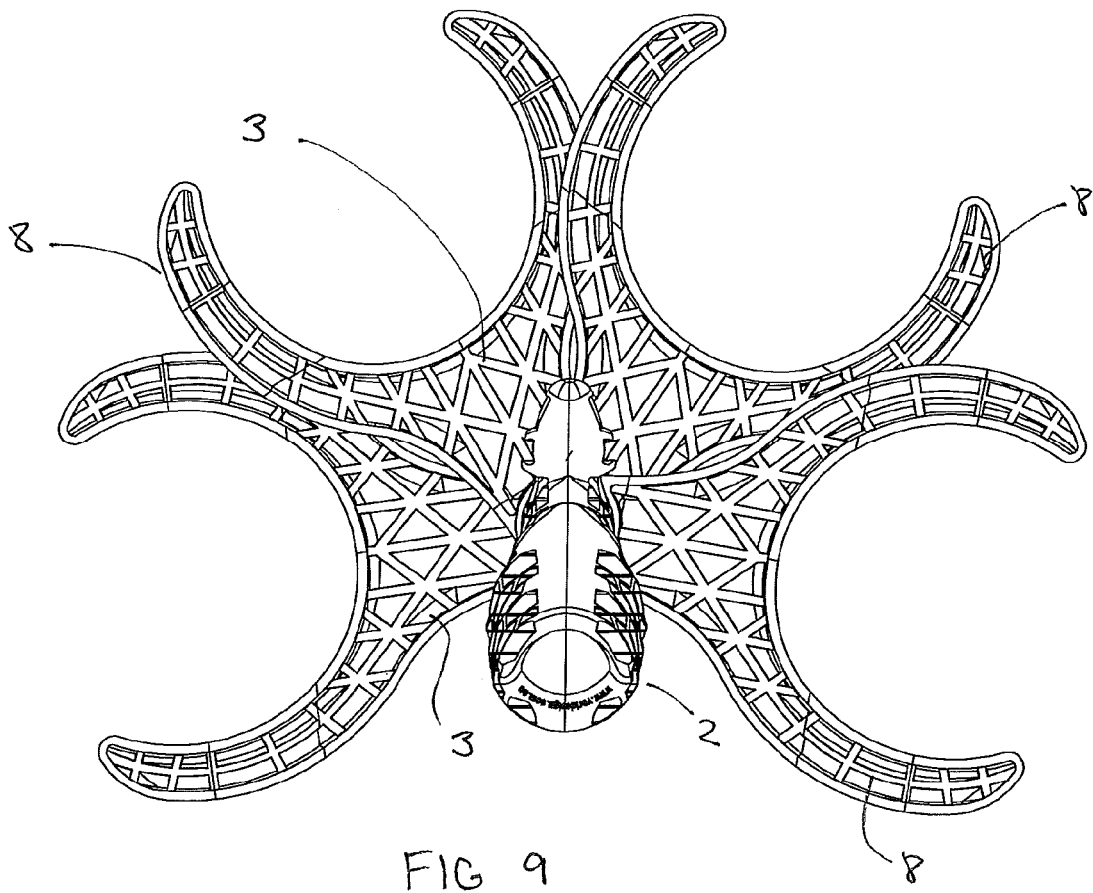
FIG. 9 shows a bottom view of the holder of FIG. 7.

As best shown in FIGS. 4 and 7 the arms 3 include an area 9 which is positioned on the arm 3 which may be used for merchandising to indicate what type of beverage is positioned in arm 3 of the holder 1 at that point. This can be especially useful with a variety of beverages that may be visually similar in appearance such as beer varieties or coffee varieties.

The holding element 8 includes a buffer element 10 which extends along the inside edge of the C-shaped member to buffer and soften the resting of the vessel on the holding element 8. The buffer 10 is tapered to provide an edge surface that interfaces smoothly with the surface of the vessel to avoid damage and provide frictional grip.

Each part of the holder 1 can be removed from the system and replaced in the case of breakage or wear on any given part. For example, the arms 3, buffer 7 and handle 2 are easily removed and replaced.

In one form the holder 1 is adapted to be connected to a belt or apron worn by a waiter for easy accessibility by the user. In another form the holder 1 has a lanyard attachment to allow for easy accessibility at outdoor events or other functions by the user.

In one form the handle 2 is provided a groove to removably interlock with a support element 11 which extends downwardly from the rear of the handle 2. The support element 11 enables the holder 1 to stand in an upright position unassisted by the user when not being carried.

The holder 1 may be made from a semi-rigid material or any material that is sufficiently sturdy and sufficiently light for the purpose. Any number of arms 3 is possible though most often the holder 1 would be designed with 3 through to 6 arms 3.

In one form the holder is adapted to be positioned in a vehicle through use of vehicle adapted. The holder 1 can be attached with a bracket and affixed to the dash or attached with an adaptor for fitting in the ordinary drink holders of the vehicle. These forms are not illustrated. The vehicle adaptor allows the drink holder to be positioned in the vehicle and held in place while the vehicle is being driven and then removed with a single hand. As it is frequently impractical to carry more than one drink from the vehicle this adds flexibility and ease to the purchase and carriage of drinks from a drive through restaurant or café.

The present invention provides for the carriage of multiple vessels with one hand. Further it provides for ease of identification of the vessels and ease of placing the vessels on a surface. Finally, it provides for storage and packing in its closed configuration.

As will be understood, unless the context requires or suggests otherwise, features of any one of the above described embodiments may be used in conjunction with another one or more of the above described embodiments.

While the invention has been described in reference to its preferred embodiments, it is to be understood that the words which have been used are words of description rather than limitation and that changes may be made to the invention without departing from its scope as defined by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

A reference herein to a prior art document is not an admission that the document forms part of the common general knowledge in the art in Australia or elsewhere.

The invention claimed is:

1. A holder for drinking vessels, the holder comprising:
   a handle;
   a plurality of arms extending from the handle, each arm being moveable in relation to one another and removably affixed to the handle;
   a holding element attached to each arm, each holding member being configured to hold a respective drinking vessel in an upright position; and
   an elongate member attached to the handle, wherein each of the arms includes an aperture for receiving the elongate member, each aperture having a diameter decreasing toward the handle so each arm is nestable within an adjacent arm, and wherein the elongate member includes a plurality of barbs adapted to secure each arm vertically along the elongate member.

2. The holder of claim 1, wherein the holding element includes a buffer member disposed along an inside surface of the holding element and configured to cushion against the vessel.

3. The holder of claim 2, wherein the holding element includes a C-shaped support configured to the hold the drinking vessel.

4. The holder of claim 2, wherein the arms are pivotable in relation to one another.

5. The holder of claim 1, wherein the arms are pivotably affixed to the handle.

6. The holder of claim 1, wherein each arm is lockable in a fixed position.

7. The holder of claim 1, wherein the handle includes a support member to support the holder in an upright position on a horizontal surface.

8. The holder of claim 1, wherein the plurality of arms is configured to move between a closed configuration where each arm aligns with one another and an open configuration where each arm is radially spaced apart from one another around a central axis.

* * * * *